United States Patent [19]

Figueroa

[11] Patent Number: 4,708,183
[45] Date of Patent: Nov. 24, 1987

[54] COMBINATION TABLE COVER AND SKIRT RETAINER

[76] Inventor: Jose L. Figueroa, Hilario Malpica #10, Costa Azul, Acapulco Gro., Mexico

[21] Appl. No.: 45,154

[22] Filed: May 1, 1987

Related U.S. Application Data

[63] Continuation of Ser. No. 780,985, Sep. 27, 1985, abandoned.

[51] Int. Cl.⁴ .................... B65D 65/02; A47B 13/16
[52] U.S. Cl. .................................. 150/52 R; 24/306; 24/523; 108/90; 248/231.7; 248/316.1
[58] Field of Search ................ 24/522, 523, 72.5, 306, 24/450, 521, 535, 536, 538, 555, 564, 571; 150/52 R; 108/90, 28; 248/231.7, 316.1

[56] References Cited

U.S. PATENT DOCUMENTS

| | | | |
|---|---|---|---|
| 640,250 | 1/1900 | Zimmlinghaus | 24/523 |
| 1,332,776 | 3/1920 | Sultanaki | 150/52 R |
| 1,459,445 | 6/1923 | Elderton et al. | 24/523 |
| 1,774,267 | 8/1930 | Hanke | 24/523 |
| 1,878,850 | 9/1932 | Hilgers | 248/231.7 X |
| 2,142,194 | 1/1939 | Karfiol | 206/813 X |
| 2,470,439 | 5/1949 | Kohler | 248/231.7 X |
| 2,494,874 | 1/1950 | Hess | 108/28 |
| 2,703,444 | 3/1955 | Proth | 24/564 |
| 3,066,321 | 12/1962 | Kintner | 24/306 |
| 3,089,211 | 5/1963 | Pensse | 24/555 X |
| 3,185,197 | 5/1965 | Spiro et al. | 150/52 R |
| 3,336,642 | 8/1967 | Armacost | 24/523 |
| 3,368,601 | 2/1968 | Gantert-Merz | 150/52 R |

Primary Examiner—Stephen Marcus
Assistant Examiner—Bryon Gehman
Attorney, Agent, or Firm—Crutsinger & Booth

[57] ABSTRACT

A table cover connectable to edges of a table top comprising: a top cover; a skirt adapted to overhang the periphery of the tabletop; and retainer members adapted to grippingly engage the edge of the table top. The retainer members have first surfaces connectable to the top cover and second surfaces adapted to engage the skirt when the skirt is placed around the edge of the table. Fastener strips on the second surfaces of the retainer members and on the skirt are positioned such that the fastener strips cooperate to support the skirt to extend around the periphery of the table top and to cover a portion of the top cover.

9 Claims, 2 Drawing Figures

COMBINATION TABLE COVER AND SKIRT RETAINER

This is a continuation of application Ser. No. 780,985 filed 09/27/85, now abandoned.

TECHNICAL FIELD

The present invention relates to a retainer for detachably connecting a table cover and skirt adjacent edges of a table. The retainer is designed for use with table covers having an overhanging skirt portion that is separately attached to the top cover portion that covers the table top. It of course can also be used with table covers wherein the skirt portion is integral with the top cover portion, or that consist only of the skirt portion.

BACKGROUND INFORMATION

Table covers are used on a variety of types of tables such as dining tables, banquet tables, and speaker stands, for example. It is often necessary to remove them, as when they get soiled or wrinkled. However, at the same time they need to be retained in place especially in applications where they are subjected to various outside influences such as wind on the beach, around swimming pools, on a veranda or in outside restaurants. Also, for those that have or consist only of a separate overhanging skirt portion, a way to detachably connect them to the table is necessary.

Heretofore, table covers have been taped to the table top, or, in the case of outdoor dining tables, the weight of place settings, ash trays, and condiment containers has been relied on to keep table covers in place. Taping is unsatisfactory because it is time consuming and the tape needs to be removed and reattached each time the table cover is changed. In the case of the outdoor tables, the table covers frequently blow off due to the wind causing dishes to be overturned and sometimes broken, with the attendant need to clean up. Also, the wind forces in some areas are such that the table covers cannot be used at all unless they are securely anchored to the table.

Heretofore clips connectable to the edge of a table were provided with grommets which snapped into sockets in a strip of material sewn onto table skirts. However, these devices required that clips be precisely located on the table to match the locations of sockets on the skirt. Further, the clips were not suitable to secure the table cloth in high winds.

SUMMARY OF THE INVENTION

The improved table cover retainer which is the subject of this application comprises a generally C-shaped member constructed of polycarbonate or other plastic material which is deformible and has sufficient memory to return to its original shape. The C-shaped member is provided with a web portion and two outwardly projecting flanges or legs which are adapted to engage spaced portions of a table cover and grippingly engage upper and lower surfaces adjacent the periphery of a table top to secure the table cover to the table top. Fasteners are provided on the web and at least one of the legs of the C-shaped member for supporting a table skirt which extends around the periphery of the table. In the preferred embodiment of the invention, the fasteners comprise strips of material secured to the web and a leg of the C-shaped member which cooperate with strips of material secured to the table skirt for securing the skirt to the C-shaped members. One of the fastener strips is provided with minute nylon hooks which penetrate and catch in a closely woven strip of nylon loops formed in the other fastener strip secured to the skirt.

BRIEF DESCRIPTION OF THE DRAWINGS

For a full understanding of the preferred embodiment of the present invention, reference may be had to the following detailed description taken in conjunction with the accompanying drawings in which.

DESCRIPTION OF A PREFERRED EMBODIMENT

Figure 2:
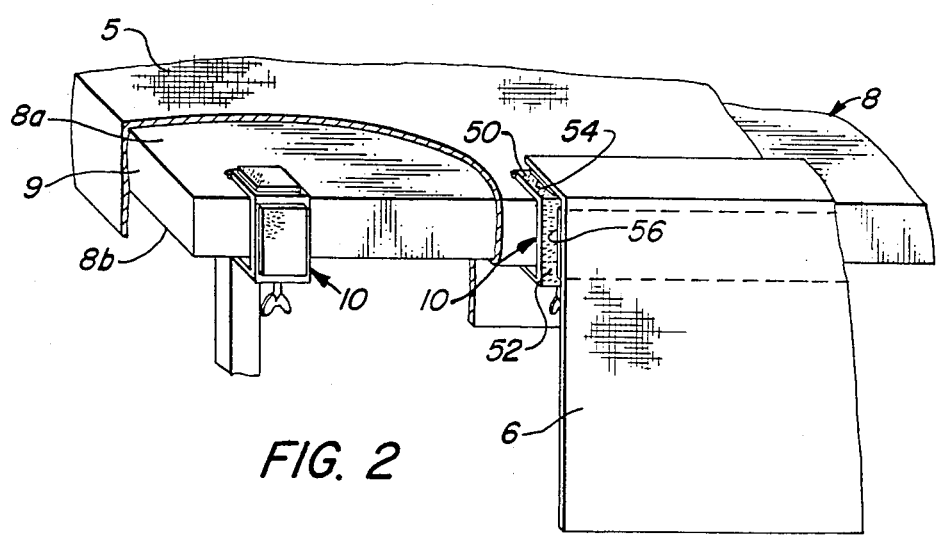
FIG. 2 is a perspective view showing the retainer detachably connecting a table cover having a separately attached overhanging skirt portion to a table.

Referring to FIG. 2 of the drawing, the numeral 5 generally designates a table cover having a top portion and a separately attached skirt portion 6. Table cover portion 5 is illustrated covering a table top 8 which has upper and lower surfaces 8a and 8b, respectively, and an edge or periphery 9. The numeral 10 generally designates a retainer member positionable either to engage spaced portions of table cover 5 to grippingly engage table top 8 adjacent the periphery thereof for securing cover 5 to table top 8, or alternatively to engage upper and lower surfaces 8a and 8b of table top 8 for securing only skirt 6 adjacent the periphery 9 of the table top 8.

Figure 1:
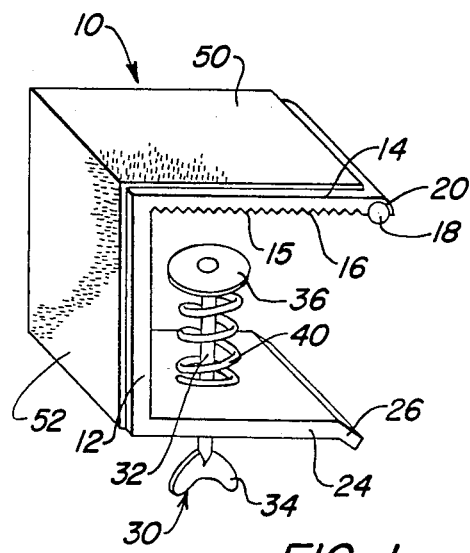
FIG. 1 is an enlarged perspective view showing the retainer.

Referring to FIG. 1 of the drawing, retainer member 10 comprises a generally C-shaped member having a web portion 12 and outwardly extending flange portions forming spaced legs 14 and 24 positioned to receive a table edge therebetween. Leg 14 of retainer 10 is preferably provided with ribs 15 to frictionally engage a table cover and a resilient cushion 18 to prevent scratching or marring of the table top. Ribs 15 preferably extend parallel to the table edge when retainer member 10 is secured to the table top 8. In the illustrated embodiment, an elongated groove 20 is formed adjacent the outer end of leg 14 and a resilient cylindrical rubber strip 18 is positioned in the groove and retained in position by adhesive. Groove 20 preferably extends around slightly greater than one half of the circumference of cylindrical cushion 18 to form an elongated socket for retaining cushion 18 in position.

The second leg 24 is spaced from the first leg 14 and preferably is provided with a deflected outer end portion 26 to facilitate guiding retainer member 10 into position adjacent the periphery 9 of the edge of table top 8. Leg 24 supports suitable gripping apparatus for securing retainer 10 in position. In the embodiment illustrated in FIG. 1 of the drawing, the gripping apparatus comprises a plunger 30 having a shank portion 32 and a butterfly gripping portion 34 secured to the outer end thereof. A coil spring 40 is captured between the surface of leg 24 and a pressure foot 36 secured to the upper end of shank 32.

Fasteners 50 and 52 are bonded or otherwise secured to web 12 and leg 14 of retainer 10 for securing skirt portion 6 of the table cover to table top 8. Fasteners 50 and 52 preferably comprise a strip of material provided with minute nylon hooks which penetrate and catch in strips 54 and 56 of closely woven nylon loops secured to skirt 6. Connector strips 50, 52, 54 and 56 are preferably of the type commercially available under the trademark "VELCRO" which comprises synthetic materials which adhere when pressed together and conventionally used as a fastener for clothing.

A generally C-shaped body portion comprising web 12 and legs 14 and 24 of retainer 10 is preferably constructed of a plastic material which after being deformed will return to its original shape. Polycarbonate is a plastic resin of a group derived from phosgene and a phenol, which is resistant to impact and heat softening. Polycarbonate is nontoxic, substantially transparent and is weather and ozone-resistant. The material is excellent for molding and extrusion.

If a table cloth or other cover 5 is to be used on a table top 8 in a location, such as in a sidewalk cafe, around a swimming pool deck, on a veranda, or on a beach where high winds are often present, retainer 10 is positioned as illustrated in FIG. 2 of the drawing to engage spaced locations on table cover 5 to grippingly engage the edge of table top 8 for retaining table cover 5 in position.

Table cover 5 is first positioned on table top 8, the butterfly portion 34 on plunger 30 is moved downwardly to compress spring 40 to move pressure foot 36 toward leg 24 of retaining device 10. Retainer 10 is then positioned such that the edge of the table top 8 extends between legs 14 and 24. Releasing butterfly portion 34 will cause spring 40 to resiliently urge pressure foot 36 into engagement with the table cover and urge the table cover into engagement with the lower surface 8b of the table top. The upper surface of the table top is contacted by ribs 15 on the lower surface 16 of leg 14 to frictionally engage the table cover and cushion 18 prevents damage to the table.

A plurality of retainers 10 are preferably positioned at spaced locations around the periphery of the table top for maintaining table cover 10 in position.

As hereinbefore described, skirt portion 6 of the table cover is preferably provided with strips 54 and 56 of fastening material which will adhere to strips 50 and 52 of fastening material on retainers 10. Thus, for attaching the skirt to the table after table cover 5 has been anchored by retainer members 10, fasteners 54 and 56 are merely positioned adjacent fasteners 50 and 52 to form a straight smooth edge around the periphery of the table top.

It should be readily apparent that if skirt 6 is not to be employed fastener strips 50 and 52 may be eliminated.

It should be readily apparent that skirt 6 may be secured to table top 8 by retainers 10 even though top cover portion 5 is not employed by merely connecting retainers 10 directly to the table top so that fastener strips 54 and 56 are connectable to fastener strips 50 and 52 on retainers 10. Table skirt 6 need not comprise a conventional "tablecloth" but may be employed as a decoration or to display advertising or instructional material.

In the illustrated embodiment of the invention, the upper leg 14 of retainer 10 is relatively short and is substantially square. However, in certain applications it may be desirable to form upper leg 14 such that it is substantially longer than that illustrated to engage greater surface area on table cover 5 or to increase the surface area of fastener strips 50 and 52. In addition, it will be readily apparent that web 12 of retainer 10 need not be a straight planer member and that it may assume any shape or configuration to conform to the periphery 9 of the table top. Further, web portion 12 may comprise a generally L-shaped member (not shown) to extend around the corner at the intersection of peripheries of the table such that four retainers 10 may be used at the four corners of a conventional rectangular table top for securing a table cover into position and to locate the retainers to minimize possibility that retainers will be offensive.

Retainers 10 may be provided with a decorative or ornamental appearance to enhance the appearance of the table. It should also be noted that while gripping mechanism 30 in the illustrated embodiment comprises a spring 40 and pressure foot 36, other gripping apparatus such as screws, cams or wedges may be employed for gripping the edge of the table top.

What is claimed is:

1. A retainer to secure a table cover adjacent the edge of a table top comprising: a resilient retainer member; first and second legs on said retainer member; a resilient cushion secured to said first leg, said cushion being positioned to prevent marring of a table top by said first leg; ribs on the first of said legs connectable to a table cover, said ribs being arranged to extend generally parallel to the edge of the table top when the retainer is secured thereto; means on the second leg to grippingly engage the edge of the table top, said retainer member being positionable to detachably secure the table cover to the table top adjacent the edge of the table top; and fastener means on said retainer member, said fastener means being connectable to a separate skirt portion of the table cover for supporting the skirt portion adjacent the edge of the table top.

2. A retainer according to claim 1, said gripping means comprising a pressure foot; means movably securing said pressure foot relative to said second leg; and means resiliently urging said pressure foot toward said first leg.

3. A retainer according to claim 1, said retainer member and said first and second legs being integrally formed of extruded polycarbonate.

4. A table cover according to claim 1, wherein said fastener means comprises: a plurality of discrete contact fastening members disposed on said retainer means and along said skirt.

5. A table cover according to claim 4, wherein said contact fastening members comprise: loop-type fasteners on said retainer means; and hook-type fasteners positioned on said skirt adapted to coact with said loop-type fasteners.

6. A table cover connectable to edges of a table top comprising: a top cover; a skirt adapted to overhang the periphery of the table top; a plurality of spaced table cover retainers, each retainer being adapted to grippingly engage the edge of the table top, each said retainer having a first surface connectable to the top cover and a second surface adapted to engage said skirt when said skirt is positioned around the periphery of the table top; contact fastener means on said second surface of each said retainer; an elongated contact fastener strip on said skirt, said contact fastener means being connectable at spaced locations along said strip extending along a substantial portion of the length of the table top to support said skirt to extend around the periphery of the table top and to cover a portion of the top cover.

7. A table cover according to claim 6, wherein said retainer means comprises a plurality of retainer means, each of said retainer means having a first surface that is positionable into engagement with said top cover to urge said top cover into frictional engagement with a tabletop.

8. A table cover according to claim 6, wherein each of said retainer means further comprises a plurality of spaced ribs traversing said first surface and adapted to grippingly engage said top cover portion; and a deformable resilient cushion member on said first surface adapted to grippingly engage said top cover.

9. A retainer to secure a table cover adjacent the edge of a table top comprising: a resilient retainer member; a web portion and first and second legs on said retainer means, said retainer member and said first and second legs being integrally formed of extruded polycarbonate; friction means on the first of said legs to grippingly engage a table cover; a resilient cushion on an unsupported end of said first leg, said cushion being positioned to prevent marring of a table top by said first leg; a pressure foot operatively connected to said second leg; means movably securing said pressure foot relative to said second leg; means resiliently urging said pressure foot toward said first leg; and hook and loop fastener means on said web portion and said first leg, said fastener means being connectable to a separate skirt portion of the table cover for supporting the skirt portion adjacent the edge of the table top.

* * * * *